United States Patent [19]

Dickinson et al.

[11] 4,238,779

[45] Dec. 9, 1980

[54] DATA TRANSMISSION AND RECEPTION SYSTEM

[75] Inventors: Robert V. C. Dickinson, Berkley Heights, N.J.; Alan W. Entenman, Hicksville; Jans Kliphuis, Huntington, both of N.Y.

[73] Assignee: Intech Laboratories, Inc., Bohemia, N.Y.

[21] Appl. No.: 916,834

[22] Filed: Jun. 19, 1978

Related U.S. Application Data

[60] Division of Ser. No. 736,364, Oct. 28, 1976, which is a continuation-in-part of Ser. No. 676,558, Apr. 13, 1976, Pat. No. 4,092,596.

[51] Int. Cl.² .............................. G06F 11/00
[52] U.S. Cl. .................... 371/5; 371/22; 235/302
[58] Field of Search ........... 340/146.1 E, 146.1 A X; 235/302; 324/73 R; 325/41, 1

[56] References Cited

U.S. PATENT DOCUMENTS

| | | | |
|---|---|---|---|
| 3,496,536 | 2/1970 | Wheeler et al. | 340/146.1 E |
| 3,622,877 | 11/1971 | MacDavid et al. | 324/73 R |
| 3,760,354 | 9/1973 | Ginn | 340/146.1 E |
| 3,824,548 | 7/1974 | Sullivan et al. | 340/146.1 E |
| 4,064,459 | 12/1977 | Markwitz et al. | 325/41 |
| 4,100,531 | 7/1978 | Kobayaski et al. | 340/146.1 E |

Primary Examiner—Charles E. Atkinson
Attorney, Agent, or Firm—Hopgood, Calimafde, Kalil, Blaustein & Lieberman

[57] ABSTRACT

A full duplex data modem for general application, e.g., cable system signal distribution, terrestrial or satellite radio link, or the like includes transmit and receive portions for permitting reliable communications between plural stations coupled to the common communications link.

In accordance with the present invention, a fixed value is applied to a modem adapted in a test mode to speak with itself, and the number of transitions counted at the modem receiver output, to measure the error rate of an entire system.

4 Claims, 5 Drawing Figures

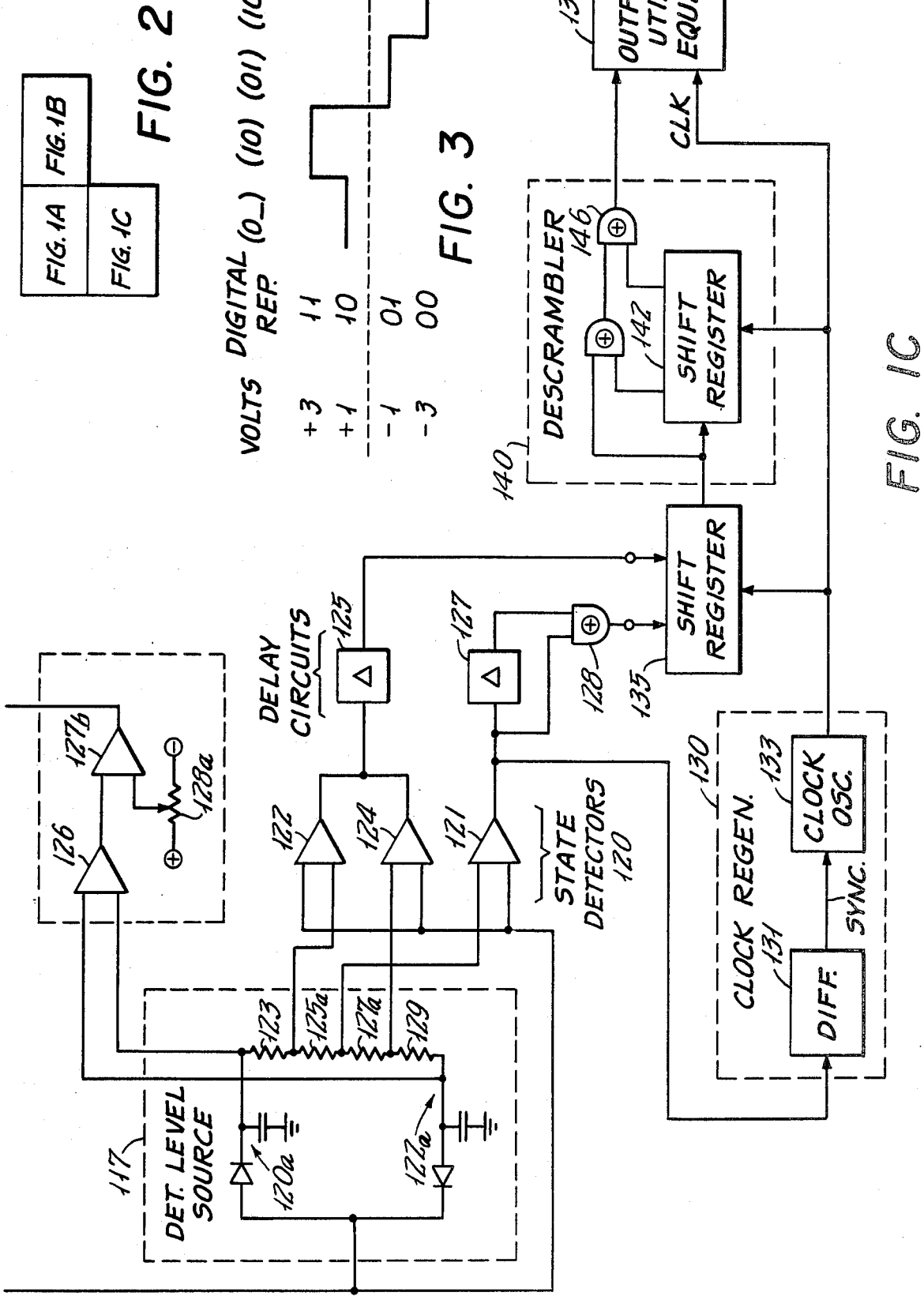

DATA TRANSMISSION AND RECEPTION SYSTEM

This is a division of application Ser. No. 736,364 filed Oct. 28, 1976 which, in turn, was a continuation in part of application Ser. No. 676,558 filed Apr. 13, 1976 and now U.S. Pat. No. 4,092,596.

DISCLOSURE OF THE INVENTION

This invention relates to electrical communications and, more specifically, to an improved modem arrangement, and to improved apparatus and methodology for testing and aligning both modems per se, and a composite communication system. The disclosure of said Ser. No. 676,558 application is hereby included herein by reference.

It is an object of the present invention to provide improved modem apparatus, and improved methodology and apparatus for testing and aligning system levels in a composite communication system.

More specifically, it is an object of the present invention to provide a flexible modem wherein transmission modulation and encoding may be varied by interchanging stored information parameters, as by substitution of ROMs.

It is another object of the present invention to provide a transmission system making efficient use of frequency spectrum, employing multi-bit encoding, and cascaded digital transversal equalizer and low pass filter circuits.

It is a further object of the present invention to provide a modem employing a pre-frequency translation pilot carrier insertion to render data demodulation independent of frequency translation errors.

It is yet a further object of the present invention to provide a method for testing a composite communication system by employing a fixed state at a modem input, and a transition counter at a modem output.

It is yet a further object of the present invention to provide a method for aligning a transmission system by connecting a modem for transmission to itself, and adjusting modem parameters based upon the received signal level.

The above and other objects and features of the present invention are realized in a specific illustrative communications system, e.g., adapted to provide a point-to-point add-on-service to a video distributing coaxial cable network, for satellite or other radio communications, or the like. The modem includes a shift register, and a ROM with ancillary register/counters for providing a scrambled multi-bit encoding of an incoming data signal. The encoded (e.g., di-bit) signal is then supplied to an equalizer and low pass filter to provide a band limited, properly encoded modulation signal which is impressed upon the communications link (e.g., a coaxial cable) in suppressed carrier form, as via a balanced modulator.

The ensemble of such signals, from variating system modems, each in a preassigned frequency slot, propagate "upstream" to a head end where pilot carriers are added and a frequency translation made to a "downstream" frequency band. In the receiving portion of any modem, a selected pilot and data spectrum band are separately isolated and mixed to generally select a frequency spectrum containing the particular data channel which is to be received. The particular channel is reduced to base band and selected via a Costas (phase locked) loop and low pass filter, and the di-bit encoding demodulated and descrambled to provide the desired information.

In accordance with varying aspects of the present invention, modem transmit and receive sections may be adapted to communicate with one another. For such an arrangement, employing a fixed input and counting the number of data transitions at the receiver output provides a very convenient way of checking the error rate of the entire communication system. Further, by monitoring the level of the signal being received (as by examining an AGC level), proper system signal levels may be implemented.

The above and other features and advantages of the present invention will become more clear from the following detailed description of a specific illustrative modem and transmission system arrangement presented hereinbelow in conjunction with the accompanying drawing, in which:

FIGS. 1A–1C schematically depict a modem - transmission system embodying the principles of the present invention;

FIG. 2 illustrates the spatial arrangement of FIGS. 1A–1C; and

FIG. 3 depicts an illustrative di-bit modulation pattern for the instant invention.

Figure 1A:
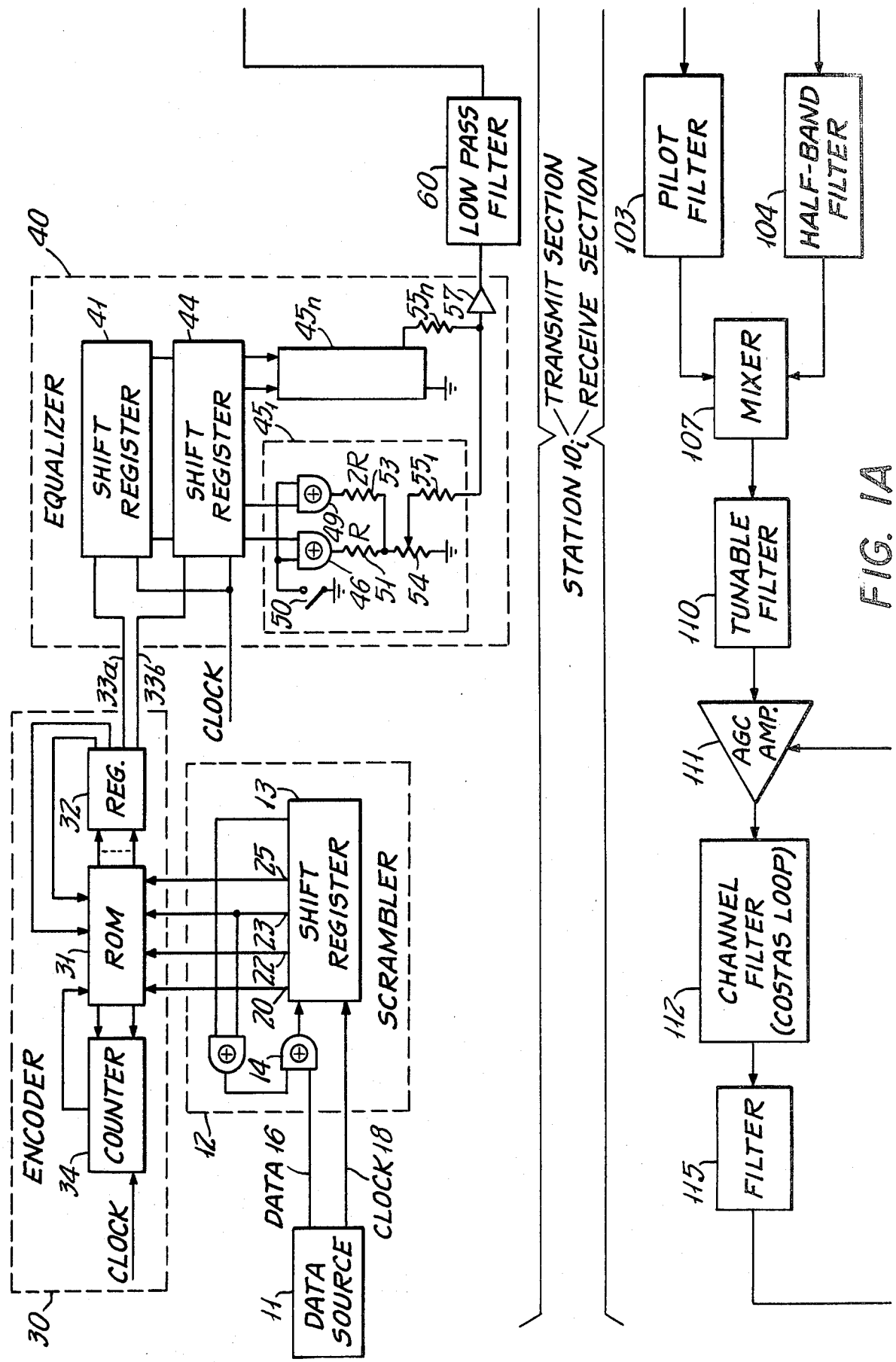
Figure 1B:
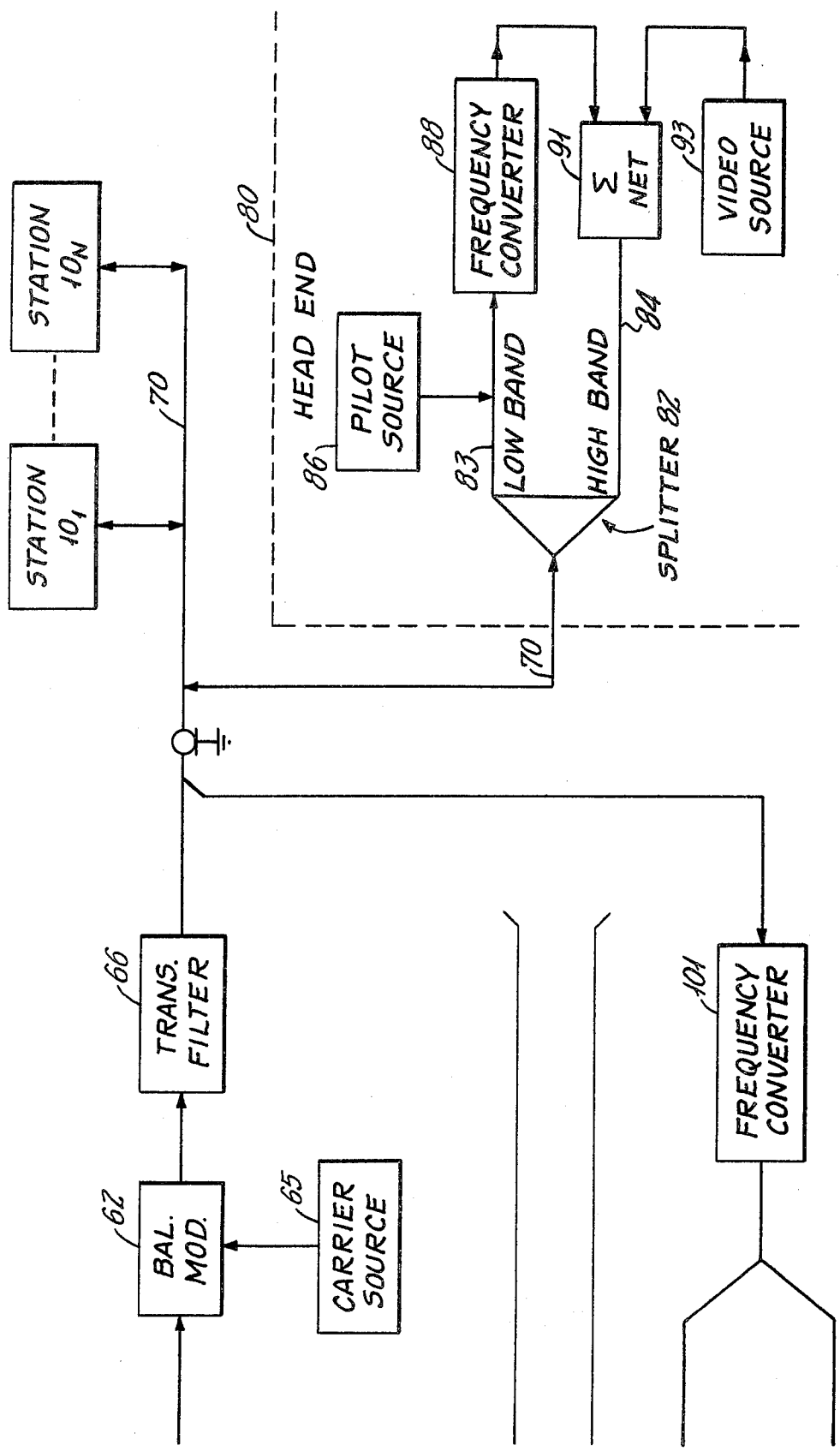

Referring now to the drawing, there is shown in FIGS. 1A–1C (hereinafter referred to as composite FIG. 1), a composite communications system, including modem apparatus for plural stations 10 connected to a signal distribution link, e.g., a coaxial cable 70. The modem at the station $10_i$ includes a transmit section having its input connected to a data source 11 of any conventional type, and a receive section which supplies output income data to any conventional output utilization equipment 137. While the communication system in FIG. 1 illustrates a cable network as implementing the distribution media 70—it will be appreciated that any communications link may be employed. Thus, by way of only one further illustration and limitation, modems of the instant invention are being employed for satellite radio communications.

In brief, overall terms, for the cable distribution system shown in FIG. 1, the transmit section of the several system stations 10 connected to the cable 70 are each assigned a different and unique frequency band. The ensemble of transmitted frequencies for the station 10 modems is impressed on to the cable 70 in a modulation (suppressed carrier) form to be discussed, and propagate in the so called "upstream" direction toward a head end 80. A typical frequency spectrum for upstream transmissions in a cable network is in the range of 5–50 MHz. At the head end, a frequency separating (e.g. bridge) filter 82, often referred to as a splitter, isolates this upstream low frequency band signals at an output port 83. A pilot source 86 is employed at the head end 80 to insert two pilot sinusoids into the upstream signal ensemble of all frequencies received from the transmitting portions of the several system stations 10. It will be appreciated that one possible reason for the very existence of the cable distribution network 70 is to distribute video (television) programs each characterized by 6 MHz bandwidth and with picture and sound carriers spaced by 4.5 MHz. It is thus convenient to group the upstream transmissions from the several system stations 10 (again each being of a unique and different frequency into a 6 MHz band and to insert the pilot sinusoids at frequencies corresponding to the 4.5 MHz spaced pilot and sound carrier positions.

The array of the two pilots and the digital transmissions from the stations 10, occupying one (or, if desired, more) video band is up-converted by any standard heterodyne frequency converter 88 and supplied to a linear summing network 91, together with any television or other signals as supplied, for example, by a video source 93. The output of the summing network 91 is supplied to the high band input port of the splitter 82 for impression on the cable 70 for downstream distribution, e.g., somewhere in the spectrum 50–300 MHz for a typical cable system.

At any one of the receiver portion of a station 10 modem, the receiving equipment examines a particular relatively narrow segment of the spectrum associated with downstream data distribution, and recovers the information destined for that station for supply to the appropriate output utilization equipment 137.

With the above overview in mind, the detailed functioning of an illustrative modem, specifically the modem for the station $10_i$ illustrated in FIG. 1, will now be considered. The data source 11 at the station $10_i$ supplies binary data via a data line 16 and clock pulses over a line 18 to the modem. The data source may be any well known type, e.g., a computer, teletypewriter, facsimile and so forth. In accordance with standard practice, the data is first inserted into a scrambler 12 employed to develop a quasi-random output distribution between binary states. Such a scrambler is employed to prevent the communications system from residing for long periods in one state, as might otherwise occur if a source 11 dwelled in one state while inactive. The particular scrambler 12 shown comprises the per se well known combination of a shift register 13 supplied at its input with the Exclusive-OR logical combination (gates 14) of the input data and the output of the final shift register stage. The scrambled form of the data originally obtaining on line 16 is present at the output of the Exclusive-OR gate 14. Accordingly, the last four data bits are present at the first four register stages which have output leads 20, 22, 23 and 25 connected thereto.

In accordance with one aspect of the present invention, the particular transmission modulation pattern is flexible and depends upon the stored contents of the particular ROM 31 employed. In general, a composite encoder 30 is employed to effect multiple bit encoding in a ROM-dependent pattern. For concreteness, it will be assumed herein that di-bit encoding is to be utilized, i.e., that the modulation impressed by the transmit section of the modem will be effected treating two consecutive scrambler-produced data bits as a unit. Moreover for purposes of system reliability and to obviate the effect of system polarity inversions, differential di-bit encoding will be employed wherein the values on the two output lines and 33b from the encoder 30 depend not only on the two data bits then being processed, but also upon the previous transmission.

By way of background, and with reference to FIG. 3, the modulation signal in accordance with the instant invention (for the assumed di-bit modulation pattern) includes four voltage states (e.g., plus three volts, plus one volt, minus one volt, and minus three volts) as shown, respectively give digital representations 11, 10, 01 and 00. The two bits "ab" forming one di-bit group are given a significance such that the first digit "a" is a 1, a 3 volt (plus or minus) modulation will be effected, while a "0" in the first digit position will signal a one volt level (of either polarity). The second, "b" digit will signal a polarity reversal (plus to minus or vice versa) if it is a "1", and no polarity reversal if it is a "0". Starting with a plus 1 volt level for an assumed first di-bit group "0—", the pattern of FIG. 3 may be confirmed by the reader for the assumed following di-bit data groups "10", "01", and "10". It must be appreciated that the output of encoder 30, i.e., the output information to be supplied by ROM 31 into holding register 32, depends in general upon the present di-bit group, and the previous di-bit group and transmission pattern. Accordingly, ROM 31 is supplied with inputs comprising the four stage outputs of the shift register 13 via leads 20, 22, 23 and 25 as well as state information from the holding register 32. A counter 34 is supplied with the clock signal to supply a ROM "read" signal when appropriate (for a constant di-bit modulation, the counter 34 may simply comprise a divide-by-two counter to divide down counter pulses for di-bit grouping). For maximum flexibility where varying and possibly even a changing pattern of digits-per-group is employed, the ROM may preset the counter 34 to supply an overflow, ROM interrogating bit after the appropriate number clock pulse counts.

It will be appreciated that the encoder 30 described is characterized by maximum flexibility including the capability of changing the number of data bits to be assembled into any one transmission level. Where a di-bit group is to continuously be transmitted, it is observed that the encoder 30 may be implemented by a simple combinational circuit supplied with four inputs, viz., the value of the presently considered di-bit group and with two bits representing the previous transmission level.

The encoded two bit output of encoder 30 of lines 33a and 33b are supplied to a transversal equalizer 40 which generates at its output, i.e., at the output of an amplifier 57, a predistorted analog signal which is then reduced in its upper spectral content by a low pass filter 60, e.g., a nine pole filter. The sharp response low pass filter 60 inherently exhibits a natural response which rings sharply. Accordingly, the equalizer 40 is employed to, in essence, anticipate the transients which the filter 60 will develop and to preinject an input into the filter 60 which will cancel the propensity of the filter to otherwise ring. By a superposition analysis, the combination of the equalizer 40 and the filter 60 will provide a band limited analog signal which generally resembles the particular modulation analog signal generally shown in FIG. 3.

To this end, the equalizer 40 includes two shift registers 41 and 44 for respectively shifting the digital signals on the leads 33a14 33b. Outputs of corresponding stages of the shift registers 41–44 are supplied to processing circuits, one such processing circuit $45_1$ being shown in detail. Each processing circuit 45 includes a pair of Exclusive/OR gates 46 and 48 for selectively inverting the associated pair of shift register output signals depending upon the state of the switch 50 (an open circuit being a "1" and a low impedance to ground being a binary "0" for the assumed current sinking TTL or DTL logic).

The two output signals are binary weighted by R-2R weighted resistors 51 and 53 and summed in a potentiometer 54. The tap on the potentiometer 54 is adjusted (as are the array of switches 50) to select a particular significance for the i-th stage vis-a-vis the other stages, and the output of the array of n potentiometer 54 summed via resistors 55 to generate the analog input for amplifier 57. As a practical matter, the switches 50 and potentiometers 54 are set while examining the transmission pattern (so called eye-pattern) for transmitted signal to maximize the discrimination areas, or windows, by an add manipulation basis.

Again, the equalizer 40 is used to predistort the input to the low pass filter 60, such that the band limited output of the filter 60 is "clean", and presents the maximum possible separation for eventual signal demodulation. Once set, the adjustment of the switches 50 and resistors 54 need not be readjusted for any fixed combination of equalizer 40 and filter 60.

The band limited modulation signal from low pass filter 60 is supplied as the modulation input to a balanced modulator 62, together with a carrier at the frequency assigned to station $10_i$ from a source 65. The balanced modulator 62 together with the following transmitter filter 66, thus impresses the suppressed carrier, amplitude modulated, band limited signal for transmission to the head end 80 on the cable 70.

As above discussed, the signal transmitted to the head end by the transmitter section of Station $10_i$ is assembled with the like transmissions from the other stations 10 (but at spaced frequencies within 6 MHz band). The head end adds the 4.5 MHz spaced pilots, up-converts the assembled data signals, and impresses this signal assemblage on the coaxial cable for downstream distribution via the splitter 82.

At the modem receiving section, e.g., that for the station $10_i$ being here considered, the entire 6 MHz data band is down-converted in conventional manner (element 101), and one of the pilots isolated via a pilot filter 103. Further, a filter 104 is employed to supply a mixer 107 with approximately one half of the data band which is remote from the particular pilot selected by the pilot filter 103.

The selected pilot and selected data half band are supplied to a mixer 107 which has an output filter 110 tuned to generally select the frequency band destined for the particular station $10_i$ (but including as well adjacent channels not destined for the station $10_i$).

It will be appreciated that by employing the pilot and half band selecting filters 103 and 104, the modem of the invention will supply at the filter 110 the desired frequency spectrum independent of frequency translation errors obtaining in the up-converter 88 at the head end. This follows since the demodulation being effected by elements 107 and 110 is only dependent upon the frequency difference between the pilot supplied by source 86 and the frequency of the transmission effected by the transmitter section of station which does not vary with absolute frequency assignment.

The output of filter 110 is supplied, to an automatic gain control (AGC variable gain amplifier 111) and therefrom to a channel filter, e.g., a Costas loop, which converts the particular data spectrum destined for the receive portion of the station $10_i$ to base band. That spectrum is determined by the natural frequency of an oscillator included in the Costas loop as is per se well known, the Costas loop essentially acting as a narrow band phase lock detection loop capturing and detecting signals in its range. The output of the filter 115, then, is essentially the analog of the di-bit modulation substantially corresponding to the signal originally present at the output of the filter 60 of the transmitting station 10.

The output of filter 115 is supplied to a detection level source 117 which comprises a positive peak detector 120 including a diode and a capacitor, and a negative peak detector 122. Four cascaded resistors 123, 125, 127, and 129 are connected between the positive and negative peak detector outputs. The voltage difference between the outputs of detectors 120 and 122 form the received replica of the original peak-to-peak voltage level (assumed 6 volts in FIG. 3), and reflector amplitude variations undergone by the signal throughout its distribution. An AGC feedback loop comprising comparators 126 and 127 and the AGC amplifier 111 is employed to maintain the voltage difference output of the peak detectors 120 and 122 substantially constant at a level, e.g., dictated by the voltage supplied at the tap of a potentimeter 128.

The recovered modulation signal at the output filter 115 is supplied as one input to three state detecting comparators 121, 122 and 124, each of the comparators also having a second input supplied from a different junction of the detection level resistors 124, 125, 127, 129. The comparator 121 makes a decision of whether or not the incoming signal is positive or negative, (i.e., exceeds or does not exceed the voltage at the mid-point detection level between resistors 125 and 127). Thus, the output of the detector 121 in essence comprises information from the signal "b" which can be derived simply by detecting phase reversals. Correspondingly, the detectors 122 and 124 (shown as having a wired OR output connection) determine whether or not the received signal output of filter 115 is at the 3 volt level (exceeds the detection threshhold voltage at the junctions of the resistors 123 and 125, or 127 and 129 in absolute magnitude), or does not. This corresponds to the "a" signal above discussed.

For purposes of extracting the di-bits corresponding to that at the output under encoder 30 in the transmitter, delays 125 and 127, (e.g., one shift register stage, a one-shot circuit, or the like) delay the corresponding inputs thereto one clock time. The output of delay circuit 125 directly corresponds to the "a" signal and the output of delay 127 is combined with the next following signal in an Exclusive-OR gate 128 which senses any plurality change, and thus, generates the "b" signal above discussed. The "a" and "b" signals are parallel loaded into a shift resistor 135, and serially clocked out by a clock regenerator 130. The output of the shift resistor 135 is supplied to a descrambler 140 per se, well known which affects the inverse operation to that of the scrambler 12 in the transmitter. The per se well known descrambler 140 includes a shift register 142 connected as shown to cascaded Exclusive-OR gates 144 and 146. The output of the descramblers 140 is supplied to any appropriate form of output utilization equipment 137, together with the clock signal. As shown in FIG. 1, the clock regenerator 30 may simply comprise a differentiator 131 for sensing output transitions of comparator 121 which are used to synchronize a free running clock oscillator 133.

The above identified arrangement has thus been shown by the above to effectively propagate information between modems.

In accordance with one aspect of the present invention operation of both a single modem and an entire distribution system 70 including the head end 80, may be characterized as to error rate by simply employing a data source 11 comprising a fixed (constant) digital value, and employing as the output utilization equipment 137 a counter to count output data transitions systems (each of which thus represents errors). The scrambler-descrambler does, of course, ensure that the entire transmission apparatus is exercised.

It was also observed that systems levels may be established and controlled for any modem in which the receive portion is temporarily adapted to receive the output of the modem transmit portion (established by Costas loop frequency) by simply measuring and controlling the AGC output level as supplied by difference amplifier 127.

The above descriptive arrangement is merely illustrative of the principles of the present invention. Numerous modifications and adaptations thereof will be readily apparent to those skilled in the art without departing from the spirit and scope of the present invention.

We claim:

1. In combination in apparatus for determining equipment error rate, a modem including transmitting means having an input and an output and receiving means having an input and an output, means connecting said input of said modem receiving means to said output of said modem transmitting means for supplying to said receiving means data transmitted by said modem transmitting means, means for supplying a fixed, constant binary value to said input of said modem transmitting means, and counting means connected to the output of said modem receiving means for counting the occurrences of the other binary value there occurring.

2. A combination as in claim 1, comprising data scrambling means connected intermediate said fixed binary value supplying means and said input of said modem transmitting means, and descrambler means connected intermediate said counting means and said output of said modem receiving means.

3. A combination as in claim 2 wherein said connecting means comprises a coaxial signal distributing cable, and head end means including frequency translating means for translating the output received from said modem transmitting means.

4. A combination as in claim 1 wherein said counting means comprises means for counting transitions in the signal level at said output of said modem receiving means from one of said binary values to the other of said binary values.

* * * * *